United States Patent
Beeck et al.

(10) Patent No.: US 6,343,474 B1
(45) Date of Patent: Feb. 5, 2002

(54) COOLING PASSAGE OF A COMPONENT SUBJECTED TO HIGH THERMAL LOADING

(75) Inventors: Alexander Beeck, Kussaberg (DE); Beat Von Arx, Trimbach (CH); Konrad Vogeler, Dresden; Bernhard Weigand, Lauchringen, both of (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/401,309

(22) Filed: Sep. 23, 1999

(30) Foreign Application Priority Data

Oct. 8, 1998 (DE) .......................... 198 46 332

(51) Int. Cl.[7] .............................. F02C 1/00; F02G 3/00
(52) U.S. Cl. ........................................ 60/752; 416/97 R
(58) Field of Search ....................... 415/115; 416/96 R, 416/96 A, 97 R

(56) References Cited

U.S. PATENT DOCUMENTS

| | | | |
|---|---|---|---|
| 4,514,144 A | | 4/1985 | Lee |
| 5,232,343 A | | 8/1993 | Butts |
| 5,395,212 A | * | 3/1995 | Anzai et al. .............. 416/97 R |
| 5,681,144 A | * | 10/1997 | Spring et al. ............. 416/97 R |
| 5,695,320 A | | 12/1997 | Kercher |
| 5,695,321 A | * | 12/1997 | Kercher ..................... 416/97 R |
| 5,700,132 A | | 12/1997 | Lampes et al. |
| 5,738,493 A | | 4/1998 | Lee et al. |
| 5,752,801 A | * | 5/1998 | Kennedy ..................... 415/115 |

FOREIGN PATENT DOCUMENTS

| | | |
|---|---|---|
| DE | 22 60 944 | 6/1973 |
| DE | 35 18 314 | 11/1985 |
| EP | 0 527 554 A1 | 2/1993 |
| EP | 0 825 332 | 2/1998 |
| GB | 1 410 014 | 10/1975 |

OTHER PUBLICATIONS

Y. Hong et al., "Heat Transfer and Friction Factor Measurements in Ducts with Straggered and In–Line Ribs", *Transactions of the ASME*, vol. 115, Feb. 1993, pp. 58–65.

* cited by examiner

Primary Examiner—Timothy S. Thorpe
Assistant Examiner—William H Rodriguez
(74) Attorney, Agent, or Firm—Burns, Doane, Swecker & Mathis, L.L.P.

(57) ABSTRACT

A cooling passage of a component subjected to high thermal loading, which is formed as a cavity (2, 20, 30), running in a longitudinal direction (L) and curved orthogonally to the longitudinal direction (L), between a first wall (5) and a second wall (6), which in each case are connected to one another in a laterally adjacent manner, which has ribs (7, 17, 27), which are arranged on the first wall (5) and the second wall (6) such that they alternate in a longitudinal direction (L) and are staggered relative one another and, at least in sections, assume a non-orthogonal angle relative to a projected center axis (10'), and through which a cooling fluid (K) can flow in a longitudinal direction (L), in which case, when the profile of the cavity (2, 20, 30) is curved orthogonally to the longitudinal direction (L), the ribs (7, 17, 27) are formed in such a way that, in each case locally with regard to the adjacent rib of the opposite wall, they maintain a distance (a) which is half a respective local rib spacing (p). It is thereby possible to even out the heat transfer at a curved passage profile.

10 Claims, 3 Drawing Sheets

COOLING PASSAGE OF A COMPONENT SUBJECTED TO HIGH THERMAL LOADING

BACKGROUND OF THE INVENTION

1. Field of the Invention

The invention relates to a cooling passage of a component subjected to high thermal loading.

2. Discussion of Background

In fluid-flow machines, in particular gas turbines, it is quite common practice to cool components subjected to high thermal loading by integrated cooling passages, the cooling medium or cooling fluid used being air which is branched off as a partial-air flow from the working medium.

During the cooling of gas-turbine blades or combustion-chamber walls, the problem occurs that very high internal heat-transfer coefficients must be realized in order to deliver the heat flow introduced from outside to the cooling fluid and to lower the material temperature to the maximum permissible value. Special excitation mechanisms, such as, for example, ribs or pins, are therefore used for improved heat transfer.

A fundamental investigation of this problem is found in Hong, Y. J. and Hsieh, S. S. "Heat transfer and friction factor measurements in ducts with staggered and in-line ribs", Journal of Heat Transfer 1993, pp 58–65. Investigations concerning the improvement of the heat transfer by a rib arrangement in a rectilinearly running cooling passage having a rectangular cross section are described therein. The test results show that a staggered rib arrangement, in which the ribs are arranged alternately on the opposite walls, compared with a non-staggered arrangement, has advantages with regard to an improved heat-transfer coefficient and a lower pressure loss of the cooling-medium flow.

In an actual application of this knowledge, a coolable blade has been designed according to EP 0 825 332 A1, on which the invention is based. The cooling passage results as a cavity between a suction-side wall and a pressure-side wall, which are connected to one another via a leading edge region and a trailing edge region. The cavity produced in this way has a crescent-shaped cross section curved orthogonally to the longitudinal direction and extends in the longitudinal direction rectilinearly between blade root and blade tip. Arranged in the cavity alternately on the suction-side wall and the pressure-side wall are cooling ribs, which enclose an acute angle relative to a projected center axis, the center axis resulting from an orthogonal projection of a plane which runs radially to the blade and perpendicularly to the inner sides of the walls and is arranged at the widest point of the cavity. The cooling fluid is therefore directed through the cooling passage in a kind of wave motion, the special shape of the ribs providing for good cooling efficiency.

Although this cooling concept has basically proved successful in practice, it encounters problems, in particular in the case of highly twisted and arched blade geometries, with regard to the uniformity of the temperature distribution at the blade body, which partly leads to inadmissibly high stresses.

SUMMARY OF THE INVENTION

Accordingly, one object of the invention, in attempting to avoid the disadvantages described, is to provide a novel cooling passage of a component subjected to high thermal loading of the type mentioned at the beginning which enables the cooling effect to be evened out further, even when the profile of the cavity is curved orthogonally to the longitudinal direction to a very pronounced degree, and in this way enables the demand for cooling medium to be minimized.

According to the invention, this is achieved in that, in a cooling passage according to the preamble of claim 1 having a profile of the cavity which is curved orthogonally to the longitudinal direction, the ribs are formed in such a way that, in each case locally with regard to the adjacent ribs of the opposite wall, they maintain a distance which corresponds to half a respective local rib spacing.

In concrete terms, the aim is thus for the ribs, at every point, to maintain a constant distance from the staggered ribs on the opposite wall, even in the case of a profile of the walls which is curved to a very pronounced degree. It is therefore necessary according to the invention to construct the individual ribs point by point in such a way that in each case two opposite ribs, at each point of the cavity in the direction of flow, are precisely at a distance from one another which corresponds to half the local spacing. Ribs which are no longer composed of two rectilinearly running legs but have a three-dimensionally curved form are obtained as a result. It is thus possible to even out the excitation of the heat transfer to the cooling fluid and to keep the pressure loss of the latter as low as possible on account of the fluidic optimization.

The ribs are preferably designed in such a way that the ratio of local rib spacing to a local rib height is essentially constant at each point of the rib. In this way, heat-transfer intensification which is kept constant as viewed in the direction of flow of the cooling fluid is obtained, this heat-transfer intensification resulting in a temperature distribution which does not vary greatly and thus in low thermal stresses in the component.

In a further, preferred variant, it is possible to vary the ratio of local rib height to a local cavity height and thereby realize local prominences of the rib. In this way, it is possible by means of secondary flows to force the cooling fluid preferably into marginal regions of the cavity, which are subjected to high thermal loading. Due to the secondary flows which occur, the cooling fluid from the marginal region is mixed with the cooling fluid in the core region, where the thermal load introduced from outside is low.

In addition, the ratio of local rib spacing to local rib height may advantageously be adapted in such a way that a uniform temperature is maintained in the longitudinal direction of the passage.

The combination of the two last-mentioned measures, for any cooling-passage profiles, leads to extreme evening-out of the temperature distribution in both the longitudinal direction and a transverse direction perpendicular thereto.

Since the cooling-fluid temperature in the direction of flow can increase considerably by absorption of heat energy, in particular in cooling passages having a comparatively large length, the ratio of local rib height to local cavity height is advantageously increased continuously in the direction of flow, as a result of which the temperature distribution in the longitudinal direction can be evened out still further.

For most applications, it is of advantage to form the ribs in each case from two curved rib segments and an apex, as a result of which wake zones in the side region can be prevented virtually completely. The heat input is often greatest precisely at these locations, so that intensification of the cooling effect is especially important there.

The ribs are particularly preferably designed in such a way that they can be depicted in an orthogonal projection as angles having rectilinearly running legs. For a multiplicity of applications occurring in practice, this represents a rib form which is to be considered optimal from the fluidic point of view and can be produced at an acceptable cost.

In this case, the angles are particularly preferably arranged symmetrically with regard to the center axis and parallel to one another.

Although the cooling concept according to the invention can in principle be used for any cooling-passage configurations, it is especially suitable for use on a coolable turbine blade or combustion-chamber wall of a gas turbine, which are subjected to thermal loads to a particularly high degree and which, with regard to the overall efficiency, on which the cooling demand has a considerable effect, must be continually improved for ecological and economic reasons.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
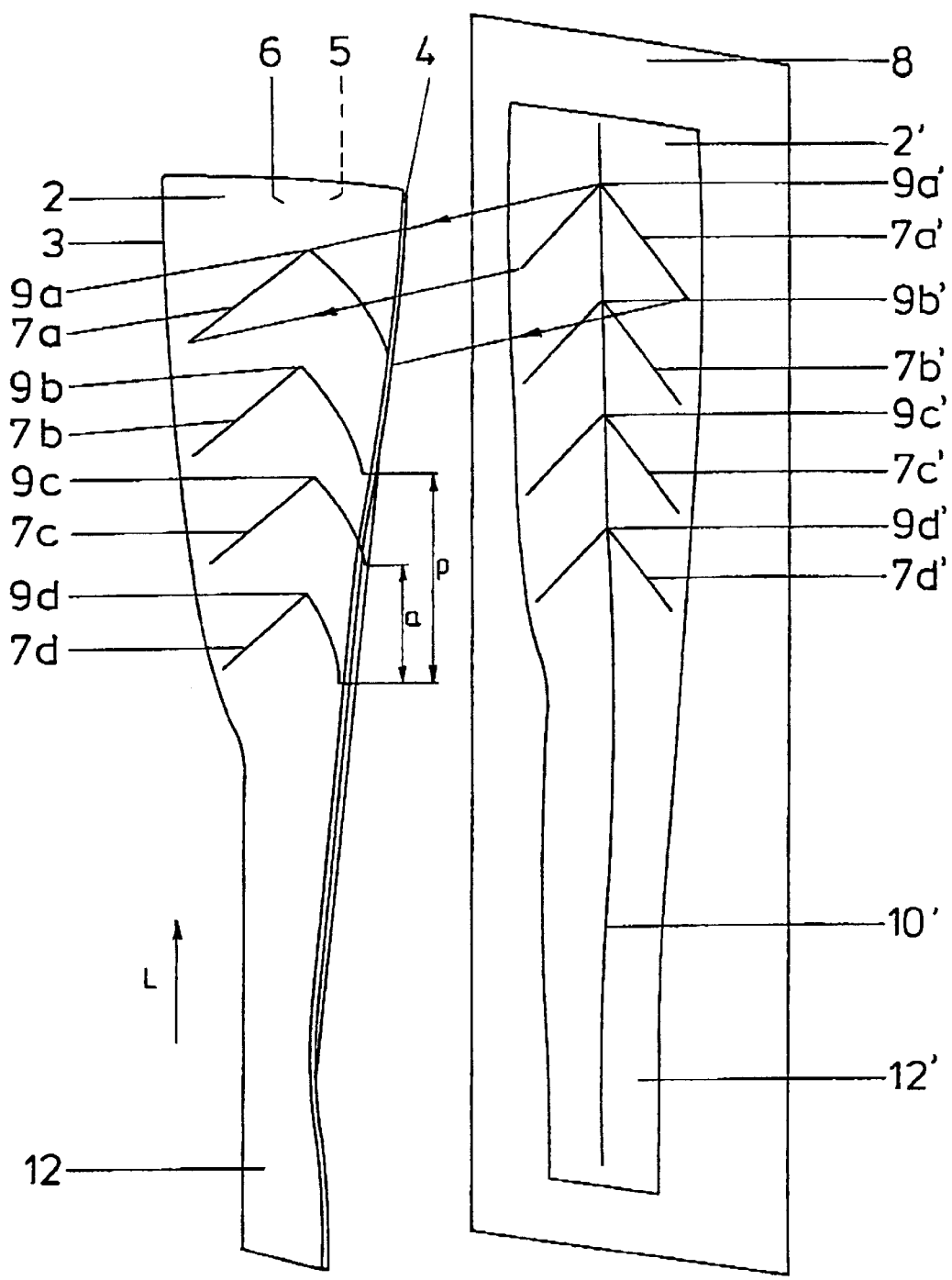
FIG. 1 shows a cooling passage of a turbine blade with ribs in perspective view including its orthogonal projection.

Referring now to the drawings, wherein like reference numerals designate identical or corresponding parts throughout the several views, FIG. 1 shows a cavity 2 of a gas-turbine blade (otherwise not shown in any more detail). It has a blade root section 12 and merges toward the top into a section which is defined by a suction-side wall 5 and a pressure-side wall 6. The suction-side wall 5 and the pressure-side wall 6 are in each case laterally adjacent to one another and are connected to one another in a leading edge region 3 and a trailing edge region 4. Ribs 7a, 7c are attached to the suction-side wall 5 and ribs 7b, 7d are attached to the pressure-side wall 6. The ribs 7a, 7b, 7c, 7d are attached such that they alternate in the longitudinal direction L and are staggered relative to one another.

In the orthogonal projection, which is predetermined by a projection plane 8, the ribs 7a, 7b, 7c, 7d are depicted as angles 7a', 7b', 7c', 7d' having rectilinearly running legs. Apexes 9a', 9b', 9c', 9d' of the angles 7a', 7b', 7c', 7d' lie on a center axis 10'. The angles 7a', 7b', 7c', 7d' are arranged equidistantly and parallel to one another.

The representation according to FIG. 1 illustrates that the ribs 7a, 7b, 7c, 7d have a curved contour, which has been produced by point-by-point construction. In this case, the condition that the distance a with regard to the respectively adjacent rib of the opposite wall is half a respective local rib spacing p is adhered to for each point.

Figure 2:
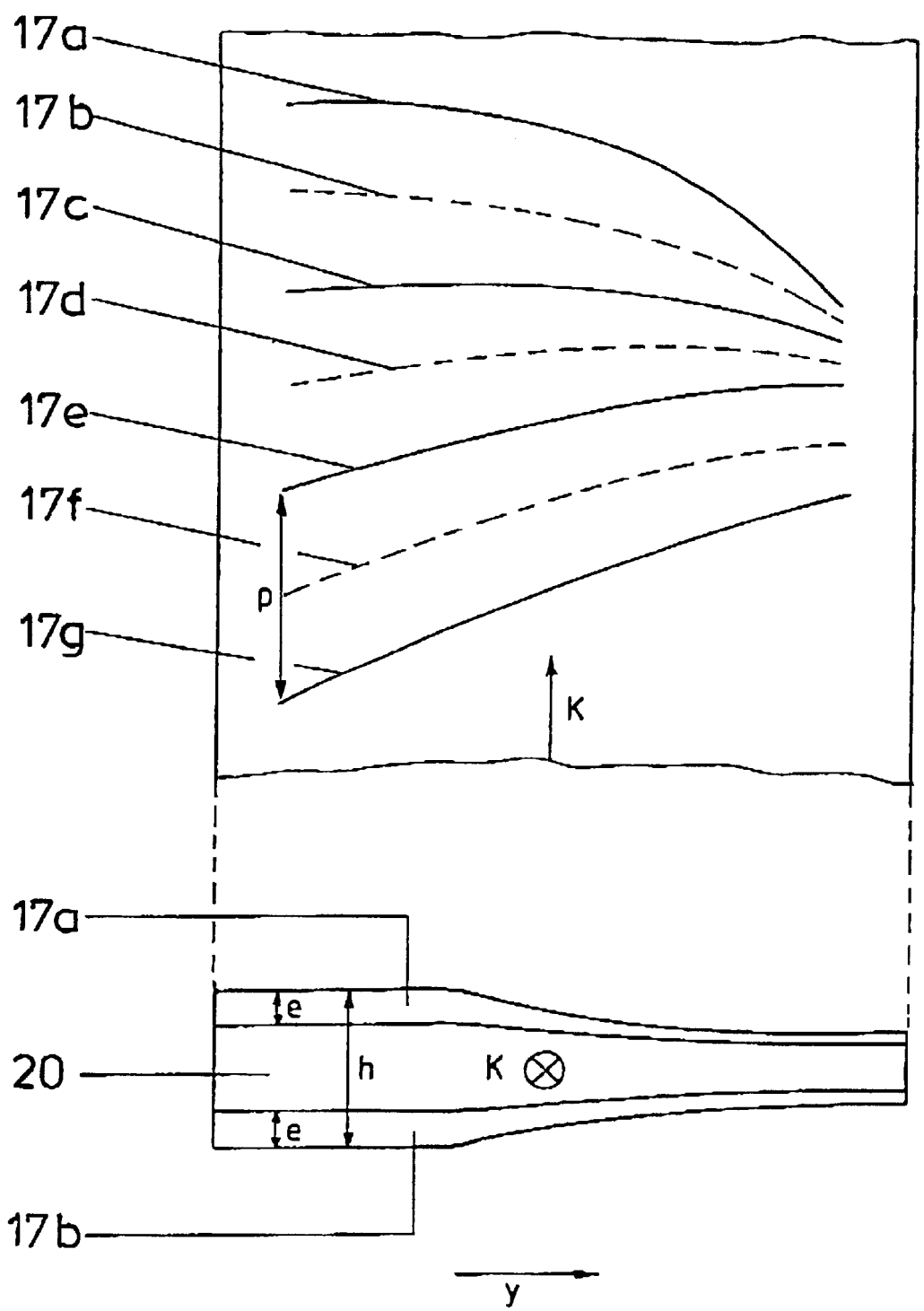
FIG. 2 shows a cooling-passage section in partial longitudinal section and in cross section; embodiment variant.

FIG. 2 shows a configuration in which the heat-transfer intensification in the direction of flow K is kept constant. A cavity 20 again has ribs 17a, 17b, 17c, 17d, 17e, 17f, 17g, which are attached such that they alternate and are staggered relative to one another. On account of the curvature of the cavity 20, the local rib spacing p varies to a very pronounced degree in a coordinate direction y, so that the ribs 17a, 17b, 17c, 17d, 17e, 17f, 17g likewise run with a very pronounced curvature.

To maintain constant heat-transfer intensification for each of the ribs 17a, 17b, 17c, 17d, 17e, 17f, 17g, it is necessary to keep the ratio of local rib spacing p to a local rib height e constant at each point. This leads to a rib form which is three-dimensionally shaped to a very high degree.

Figure 3:
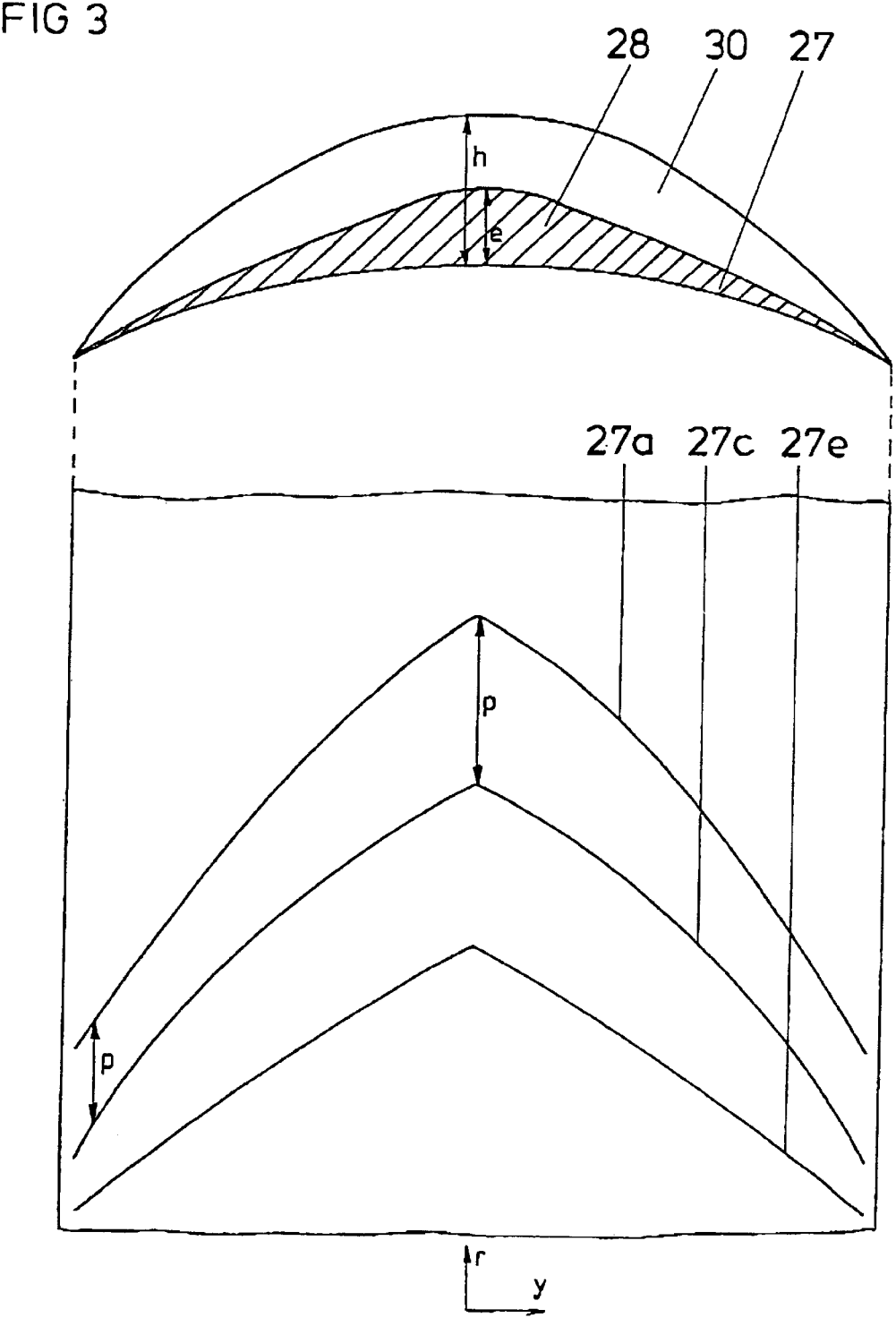
FIG. 3 shows a cooling-passage section in partial longitudinal section and in cross section; further embodiment variant.

Finally, FIG. 3 shows a configuration in which, despite non-uniform heat input from outside, a constant temperature distribution can be realized. A rib 27 has a prominence 28, which has been produced by variation of the ratio of local rib height e to a local cavity height h. In this way, the flow is deflected into the lateral regions and secondary flows occur. The secondary flows provide for mixing of highly heated cooling fluid from the marginal regions with cooling fluid from the core region and thus permit a temperature balance.

Furthermore, the ratio of local rib spacing p to local rib height e is now also in each case selected in such a way that a uniform temperature occurs in a coordinate direction r. For example, the ratio of local rib spacing p to local rib height e may be selected to be within the range of between 12 for the side region and 10 for the core region in the exemplary embodiment in FIG. 3. The result is a rib form which is contoured three-dimensionally to a very pronounced degree, each rib 27a, 27c, 27e being formed differently.

It goes without saying that the use of the cooling concept according to the invention is not restricted to the cooling-passage geometries shown in the figures. It is likewise suitable for highly curved cooling passages as occur, for example, in rotor blades of the first stage of a gas turbine.

Obviously, numerous modifications and variations of the present invention are possible in light of the above teachings. It is therefore to be understood that, within the scope of the appended claims, the invention may be practiced otherwise than as specially described herein.

What is claimed as new and desired to be secured by Letters Patent of the United States is:

1. A cooling passage of a component subjected to high thermal loading,
    said cooling passage being formed as a cavity through which a cooling fluid can flow in a longitudinal direction (L) and said cavity being curved orthogonally to the longitudinal direction (L), between a first wall and a second wall, said first wall and said second wall being connected to one another in a laterally adjacent manner,
    ribs being arranged on the first wall and the second wall such that they alternate in the longitudinal direction (L) and are staggered relative to one another and, at least in sections, assume a non-orthogonal angle relative to a projected center axis, said ribs each consisting of two rib segments, each of the rib segments having a starting point and an end point, the rib segments deviating from a straight line through their respective starting point and end point in the longitudinal direction (L) and having an apex.

2. The cooling passage as claimed in claim 1, wherein each rib is spaced a distance (a) in a direction parallel to the longitudinal direction (L) from an adjacent rib on the opposite wall, and a distance (p) in a direction parallel to the longitudinal direction (L) from an adjacent rib on the same wall, wherein (a) is approximately ½ of (p).

3. The cooling passage as claimed in claim 2, wherein the ratio of rib spacing (p) to a local rib height (e) is essentially constant at each point of the rib.

4. The cooling passage as claimed in claim 1, wherein the ratio of local rib height (e) to a local cavity height (h) varies in order to form local prominences.

5. The cooling passage as claimed in claim 2, wherein the ratio of local rib spacing (p) to local rib height (e) varies.

6. The cooling passage as claimed in claim 1, wherein the ratio of local rib height (e) to local cavity height (h) increases for ribs arranged one after the other in a longitudinal direction.

7. The cooling passage as claimed in claim 1, wherein the ribs can be depicted in an orthogonal projection as angles having rectilinearly running legs.

8. The cooling passage as claimed in claim 7, wherein all the angles are arranged symmetrically with regard to a center axis and parallel to one another.

9. The cooling passage as claimed in claim 1 as an integral part of a coolable turbine blade.

10. The cooling passage as claimed in claim 1 as an integral part of a coolable combustion-chamber wall of a gas turbine.

* * * * *